United States Patent Office 3,381,107
Patented Apr. 30, 1968

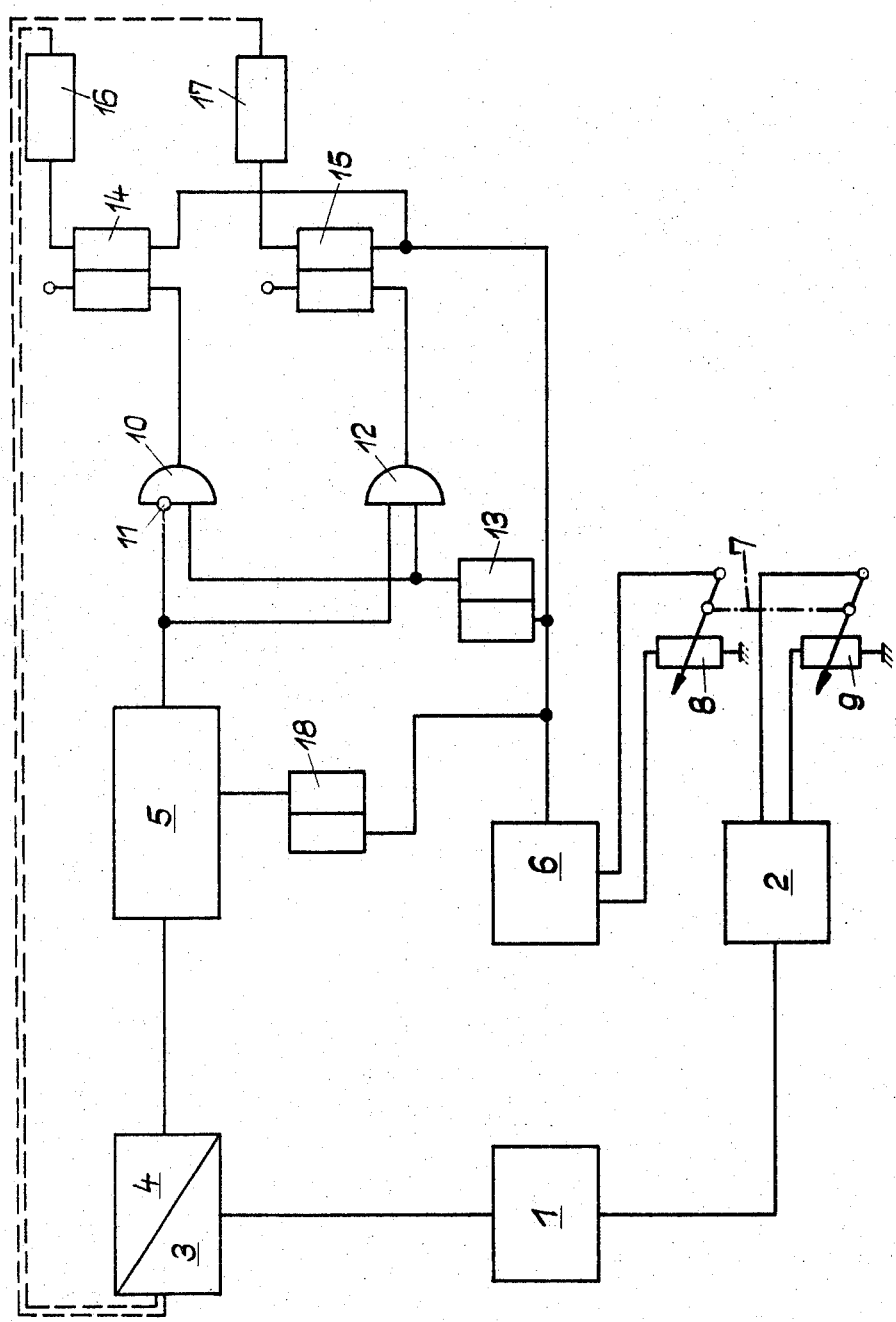

3,381,107
METHOD OF CONTROLLING THE FEED IN CONNECTION WITH ELECTROEROSIVE MACHINING
Karl Otto August Poerschke, Steinbach, Germany, assignor to Beteiligungs- und Patentverwaltungsgesellschaft mit beschränkter Haftung, Essen, Germany
Filed Apr. 22, 1965, Ser. No. 449,978
Claims priority, application Germany, Apr. 24, 1964,
B 76,496
2 Claims. (Cl. 219—69)

The present invention relates to a method of controlling the feed of a tool electrode in connection with the electroerosive machining of electrically conductive work piece electrodes with frequency controlled discharges in which the number of impulses received during a certain time period is counted and compared with a rated value and in which the ascertained deviations from said rated value are converted into directed signals for the feed drive.

This method has been suggested in such a form that in two counters there are respectively counted the produced control impulses on one hand and the discharging, idling or short-circuiting impulses on the other hand. The numbers of impulses thus ascertained within the same time periods are compared with each other while the rated value representing the optimum condition is so determined that during the production of a certain number of control impulses a certain number of discharging or idling or short-circuiting impulses occur, and deviations from this rated value, which latter represents a measure for the magnitude of the discharging gap, determine the signals for the feed drive.

It is an object of the present invention further to improve the above-mentioned method.

It is also an object of this invention to provide a method of controlling the feed in connection with electroerosive machining which will be rather simple and highly reliable.

These and other objects and advantages of the invention will appear more clearly from the following specification in connection with the accompanying drawing showing an arrangement for carrying out the method according to the present invention.

With a method of the above-mentioned general type, the present invention consists in that the discharging, idling or short-circuiting impulses are counted in a counter and at the end of each time period are compared with a rated value which represents a fraction of the product of the adjusted control frequency and the adjusted duration of the time period. In other words, with the method according to the present invention, the counting of the produced control impulses and the counter necessary therefore are saved, and instead the rated value is calculated for the adjusted control frequency and the duration of the time period while taking into consideration that independently of the other conditions of the electroerosive machining the optimum condition is always determined by the fact that the number of the discharging or idling or short-circuiting impulses is at a certain ratio (different for the said three impulse types) with regard to the number of the control impulses produced during said time period.

The method according to the present invention can, therefore, be realized by releasing a signal in response to each deviation from the rated value (two-point control). However, the invention may also be realized by releasing no signal when deviations from the rated value up to a certain upper limit or up to a certain lower limit occur so that only when these limits are exceeded a signal will be released (three-point control).

The speed of response of the feed control in conformity with the method according to the present invention can be varied in conformity with the respective adjustment of the length of the time period.

The adjustability of the control frequency for the erosion generator, which adjustability is possible within wide limits, and the duration of the time period does not require any further manual control of the feed control because the rated value is determined as a fraction of the product of the adjusted control frequency and the adjusted duration of the time period.

Referring now to the drawing in detail, the arrangement shown therein comprises an erosion generator 1 which is controlled by a rhythm indicator 2 and operates in connection with a discharge gap 3 having associated therewith a measuring station 4 for the counting of the occurring discharging impulses. The input part of the feed control proper comprises a counter 5 connected to the measuring station 4 and also comprises an adjusting part 6 for the length of the time period. In the illustrated simplified circuit, there is provided a mechanical coupling 7 for variable resistors 8 and 9 which affect the adjusting part 6 and the rhythm indicator 2. The meaning of the mechanical coupling 7 for the operation of the illustrated circuit consists in that the rhythm indicator 2 and the adjusting part 6 are automatically and correspondingly adjusted in such a way that as rated value the same number of effected discharging impulses can be ascertained in counter 5.

The output side of counter 5 is directly connected with the input side of a first and-gate 10 through a reversing stage 11 and with the input side of a second and-gate 12. The input sides of and-gates 10 and 12 are furthermore through a delaying member 13 connected with the output side of the adjusting part 6 for the length of the time period. The output side of adjusting part 6 is furthermore directly connected with the input sides of two bi-stable multi-vibrators 14 and 15 in such a way that these vibrators are by a signal arriving from part 6 switched to their dead outputs. The input sides of the two bi-stable multi-vibrators 14 and 15 are connected with the output sides of the two and-gates 10 and 12 in such a way that signals coming from the and-gates 10 and 12 switch the bi-stable multi-vibrators 14 and 15 to the output sides respectively connected with the amplifiers 16 and 17. The amplifiers 16 and 17 in their turn are connected with the feed control. Finally, the output side of the adjusting part 6 is connected to counter 5 through the intervention of a resetting delaying member 18.

The operation of the device is as follows: The adjusting part 6 first, at the end of the time period, directly switches the two bi-stable multi-vibrators 14 and 15 to the dead outputs whereby the previously present signal acting upon the amplifier 16 or 17 is quenched. At the end of the time period, the adjusting part 6 emits a signal to the and-gates 10 and 12 through delaying member 13. At this time period, counter 5 at its output side either sends a signal or no signal and, more specifically, sends no signal when the number of the effected discharging impulses is still less than the adjusted rated value, whereas a signal is emitted when the number of the effected discharging impulses exceeds the adjusted rated value. This determines whether no signal switches the first and-gate 10 through reversing stage 11 to permit the passage of a signal from the delaying member 13 or whether a signal switches the second and-gate 12 so as to permit the passage of a signal from the delaying member 13. Thus, depending on whether at the end of the time period more or less discharging impulses than correspond to the rated value have been counted by counter 5, a signal will either through the first and-gate 10 and the first bi-stable multi-vibrator 14 be sent to the amplifier 16 or a signal will be sent to amplifier 17 through the second and-gate 12 and the second bi-stable multi-vibrator 15. In conformity with the described operation, amplifier 16 is connected with that part of the feed drive which reduces the discharging gap 3, and amplifier 17 is connected with that part of the feed drive which increases the discharging gap. The signal which at the end of the time period occurs at the output side of the adjusting part 6 will with a time delay through the resetting delaying member 18 return counter 5 to its zero position so that a new control operation of the described type can be initiated. It is, of course, necessary in order to assure a proper functioning of the described circuit that the delay of the delaying member 13 is less than the delay of the resetting delaying member 18. From the above described operation of the circuit it will be evident that each occurring signal acting upon one of the amplifiers 16 or 17 will up to its quenching by resetting of the two bi-stable multi-vibrators 14 and 15 remain on the dead output sides thereof.

It is, of course, to be understood that the present invention is, by no means, limited to the particular circuit shown in the drawing and to the method described in connection therewith but also comprises any modifications within the scope of the appended claims.

What is claimed is:

1. A method of controlling the feed means of the electrode in an electro-erosion apparatus which includes an electro-erosion generator connected for supplying said electrode with frequency controlled discharges which comprises: counting the number of impulses during predetermined time periods, comparing the counted number of impulses with a nominal value, converting the deviation of the counted number of impulses from said nominal impulse values into directed signals, effecting the said counting of the impulses by counting the discharging, idling or short-circuiting impulses in a counter during the said time periods, and at the end of each said time period comparing the counted number of impulses with a nominal value which represents a fraction of the product of the adjusted controlled frequency and the adjusted duration of the time period, and controlling the feed means in conformity with said signals.

2. A method of developing signals for controlling the feed means of an eroding electrode in an electro-erosive apparatus which includes an electro-erosion generator connected to supply the electrode with frequency controlled discharges, which comprises: selecting a certain time period, selecting a nominal value which represents a fraction of the product of the adjusted controlled frequency and the adjusted duration of the time period, during said period counting the discharging, idling or short-circuiting impulses pertaining to the energy supplied to said electrode, comparing the thus ascertained value with said nominal value, and developing a signal in accordance with the difference between said values for controlling the supply of energy to the feed means of the electrode.

No references cited.

RICHARD M. WOOD, *Primary Examiner.*

R. F. STAUBLY, *Assistant Examiner.*